(12) United States Patent
Deferme

(10) Patent No.: US 8,069,964 B2
(45) Date of Patent: Dec. 6, 2011

(54) JUNCTION BLEED

(75) Inventor: Stefan Deferme, Heusden-Zolder (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 994 days.

(21) Appl. No.: 11/821,121

(22) Filed: Jun. 21, 2007

(65) Prior Publication Data

US 2008/0314704 A1 Dec. 25, 2008

(51) Int. Cl.
*F16F 9/34* (2006.01)

(52) U.S. Cl. .............. 188/322.22; 188/322.15

(58) Field of Classification Search .......... 188/322.15, 188/282.6, 322.22, 322.13; 137/493.8
See application file for complete search history.

(56) References Cited

U.S. PATENT DOCUMENTS

| 4,615,420 | A  | * | 10/1986 | Mourray | ............... | 188/322.15 |
| 6,860,370 | B2 |   | 3/2005  | Nakadate |  |  |
| 2005/0056505 | A1 | * | 3/2005 | Deferme | ............... | 188/322.15 |
| 2005/0263363 | A1 | * | 12/2005 | Katou et al. | ....... | 188/322.22 |

FOREIGN PATENT DOCUMENTS

| JP | 05-057474 | 3/1993 |
| JP | 07-027164 | 1/1995 |
| KR | 2006-0102691 | 9/2006 |

OTHER PUBLICATIONS

International Search Report dated Mar. 16, 2009 from corresponding PCT Application No. PCT/IB2008/001878.
Written Opinion of International Searching Authority dated Mar. 16, 2009 from corresponding PCT Application No. PCT/IB2008/001878.

* cited by examiner

*Primary Examiner* — Robert Siconolfi
*Assistant Examiner* — Anna Momper
(74) *Attorney, Agent, or Firm* — Harness, Dickey & Pierce, PLC

(57) ABSTRACT

A shock absorber includes a piston which has at least one compression fluid passage and at least one rebound fluid passage. A compression valve assembly closes the at least one compression passage and a rebound valve assembly closes the at least one rebound passage. An interconnecting passage connects the at least one compression fluid passage and the at least one rebound fluid passage to define an open flow path through the piston.

12 Claims, 5 Drawing Sheets

JUNCTION BLEED

FIELD

The present disclosure relates generally to automotive dampers or shock absorbers which receive and dampen mechanical shock. More particularly, the present disclosure relates to a hydraulic valve assembly for the shock absorber which includes two separate bleed restriction paths but also makes it possible to eliminate an offset damping force at zero speed.

BACKGROUND

The statements in this section merely provide background information related to the present disclosure and may not constitute prior art.

Shock absorbers are used in conjunction with automotive suspension systems to absorb unwanted vibrations which occur during driving. To absorb these unwanted vibrations, shock absorbers are generally connected between the sprung portion (body) and the unsprung portion (wheels) of the automobile. A piston is located within a working chamber defined by a pressure tube of the shock absorber, with the piston being connected to the sprung portion of the automobile through a piston rod. The pressure tube is connected to the unsprung portion of the automobile by one of the methods known in the art. Because the piston is able, through valving, to limit the flow of damping fluid between opposite sides of the piston, when the shock absorber is compressed or extended, the shock absorber is able to produce a damping force which dampens the unwanted vibration which would otherwise be transmitted from the unsprung portion to the sprung portion of the automobile. In a dual tube shock absorber, a fluid reservoir is defined between the pressure tube and the reserve tube. When a full displacement piston valving system is used, the fluid reservoir is in direct communication with the lower portion of the working chamber defined by the pressure tube (the area below the piston). All damping forces produced by the shock absorber are the result of piston valving when a full displacement valving system is used. The greater the degree to which the flow of fluid within the shock absorber is restricted by the piston, the greater the damping forces which are generated by the shock absorber. Thus, a highly restricted flow of fluid would produce a firm ride while a less restricted flow of fluid would produce a soft ride.

In selecting the amount of damping that a shock absorber is to provide, at least three vehicle performance characteristics are considered. These three characteristics are ride comfort, vehicle handling and road holding ability. Ride comfort is often a function of the spring constant for the main springs of the vehicle as well as the spring constant for the seat and tires and the damping coefficient of the shock absorber. For optimum ride comfort, a relatively low damping force or a soft ride is preferred.

Vehicle handling is related to the variation in the vehicle's attitude (i.e., roll, pitch and yaw). For optimum vehicle handling, relatively large damping forces, or a firm ride, are required to avoid excessively rapid variations in the vehicle's attitude during cornering, acceleration and deceleration.

Finally, road holding ability is generally a function of the amount of contact between the tires and the ground. To optimize road handling ability, large damping forces, or a firm ride, are required when driving on irregular surfaces to prevent loss of contact between the wheel and the ground for excessive periods of time.

Various types of shock absorbers have been developed to generate the desired damping forces in relation to the various vehicle performance characteristics. Shock absorbers have been developed to provide different damping characteristics depending on the speed or acceleration of the piston within the pressure tube. Because of the exponential relation between pressure drop and flow rate, it is a difficult task to obtain a damping force at relatively low piston velocities, particularly at velocities near zero. Low speed damping force is important to vehicle handling since most vehicle handling events are controlled by low speed vehicle body velocities.

Various prior art systems for tuning shock absorbers during low speed movement of the piston create a fixed low speed bleed orifice which provides a bleed passage which is always open across the piston. This bleed orifice can be created by utilizing orifice notches positioned either on the flexible disc adjacent to the sealing land or by utilizing orifice notches directly in the sealing land itself. The limitations of these designs is that because the orifice is constant in cross-sectional area, the created damping force is not a function of the internal pressures of the shock absorber. In order to obtain the low speed control utilizing these open orifice notches, the orifice notches have to be small enough to create a restriction at relatively low velocities. When this is accomplished, the low speed fluid circuit of the valving system will operate over a very small range of velocity. Therefore, the secondary or high-speed stage valving is activated at a lower velocity than is desired. Activation of the secondary valving at relatively low velocities creates harshness because of the shape of the fixed orifice bleed circuit force velocity characteristic is totally different in configuration than the shape of the high-speed circuit.

Prior art attempts at overcoming the problems of fixed orifice bleed valving and thus eliminate harshness during low speed piston movements have included the incorporation of a variable orifice bleed valving circuit. As the velocity of the piston increases, the flow area of the variable orifice would also increase in order to smooth the transition to the secondary valving. These prior art variable orifice bleed valving circuits are typically located at the outer periphery of the flexible valve disc and thus they are dependent on the diameter of the disc to determine the rate at which the flow area increases. As the diameter of the flexible disc increases, it becomes more difficult to control the rate at which the flow area of the orifice increases. Since the flow area is increased by the deflection of the variable orifice bleed disc, a small deflection in a large diameter variable orifice bleed disc provides a rapid increase in the flow area of the bleed orifice. This rapid increase in the flow area complicates the tuning between the low speed valving circuit and the secondary or high-speed valving circuit.

Still other prior art systems have developed variable orifice bleed valving circuits which are integrated with the mid/high speed valving systems. The integration of the low speed circuit with the mid/high speed circuit creates a system where the tuning of the low speed circuit affects the mid/high speed circuit and the tuning of the mid/high speed circuit affects the low speed circuit.

The continued development of shock absorbers includes the development of a valving system which can provide a smooth transition between a low speed valving circuit and the secondary valving or high speed valving circuit. The smooth transition between these two circuits helps to reduce and/or eliminate any harshness during the transition. In addition to the smooth transition, the development of these systems has also been directed towards the separation of these two circuits in order to be able to independently tune each of these circuits.

SUMMARY

The present disclosure provides a method for independently tuning damping forces at low piston velocities in order to improve the low speed damping characteristics of the shock absorber. The present disclosure includes a separate low speed variable orifice bleed circuit which is separate from the mid/high speed or secondary valving system. In addition, the present disclosure includes one or more fluid passages which inter-connect the separate low speed variable orifice bleed circuits to provide for the elimination of the offset damping force at zero speed while still maintaining the separate low speed variable orifice bleed circuits.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
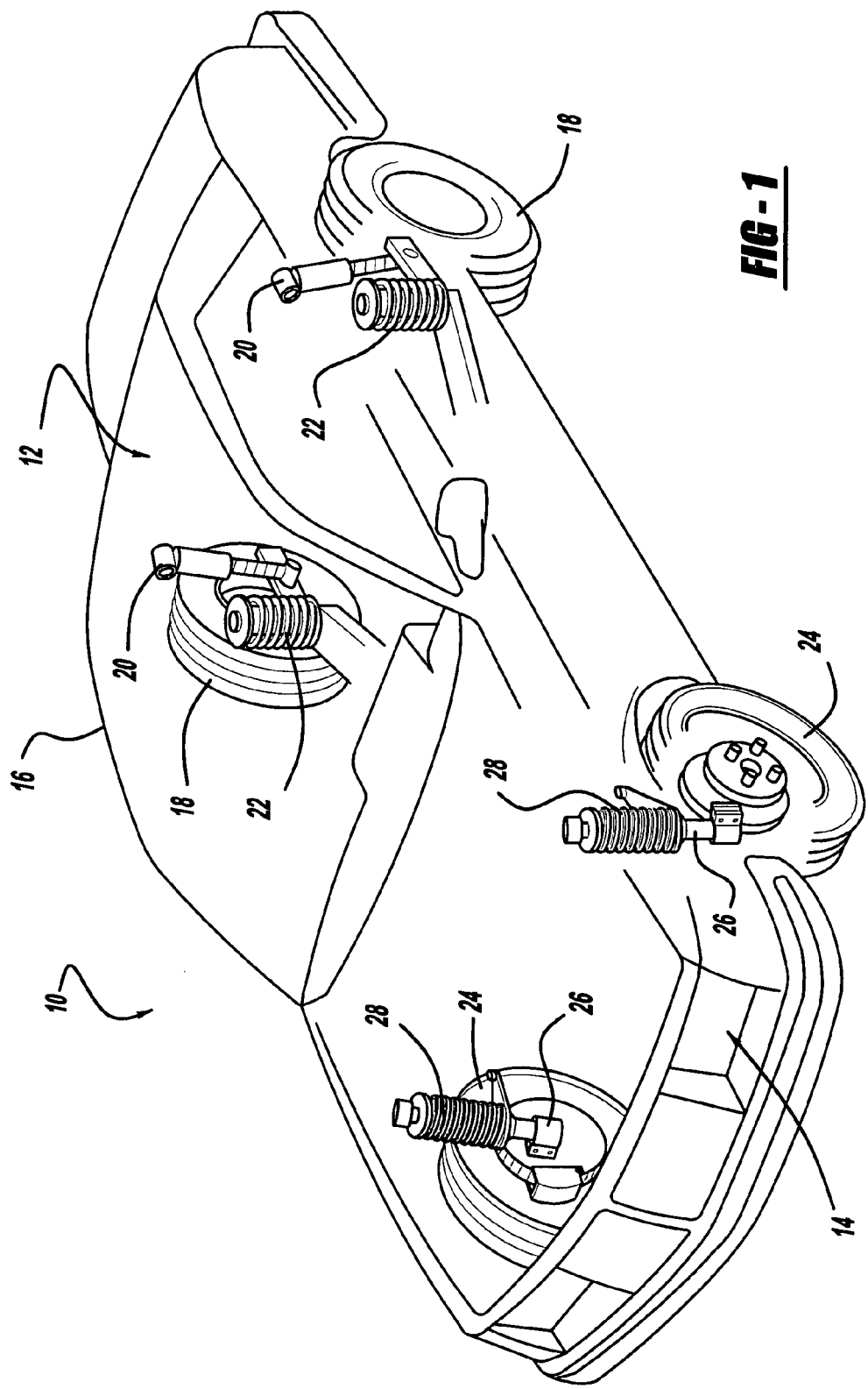
FIG. 1 is an illustration of an automobile incorporating the valving system in accordance with the present disclosure.

Referring now to the drawings in which like reference numerals designate like or corresponding parts throughout the several views, there is shown in FIG. 1 a vehicle incorporating a suspension system having the independent variable bleed orifice in accordance with the present disclosure which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e., front and rear suspensions 12 and 14, respectively) and the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating independent front and/or independent rear suspension systems. Further, the term "shock absorber" as used herein is meant to refer to dampers in general and thus will include McPherson struts.

Figure 2:
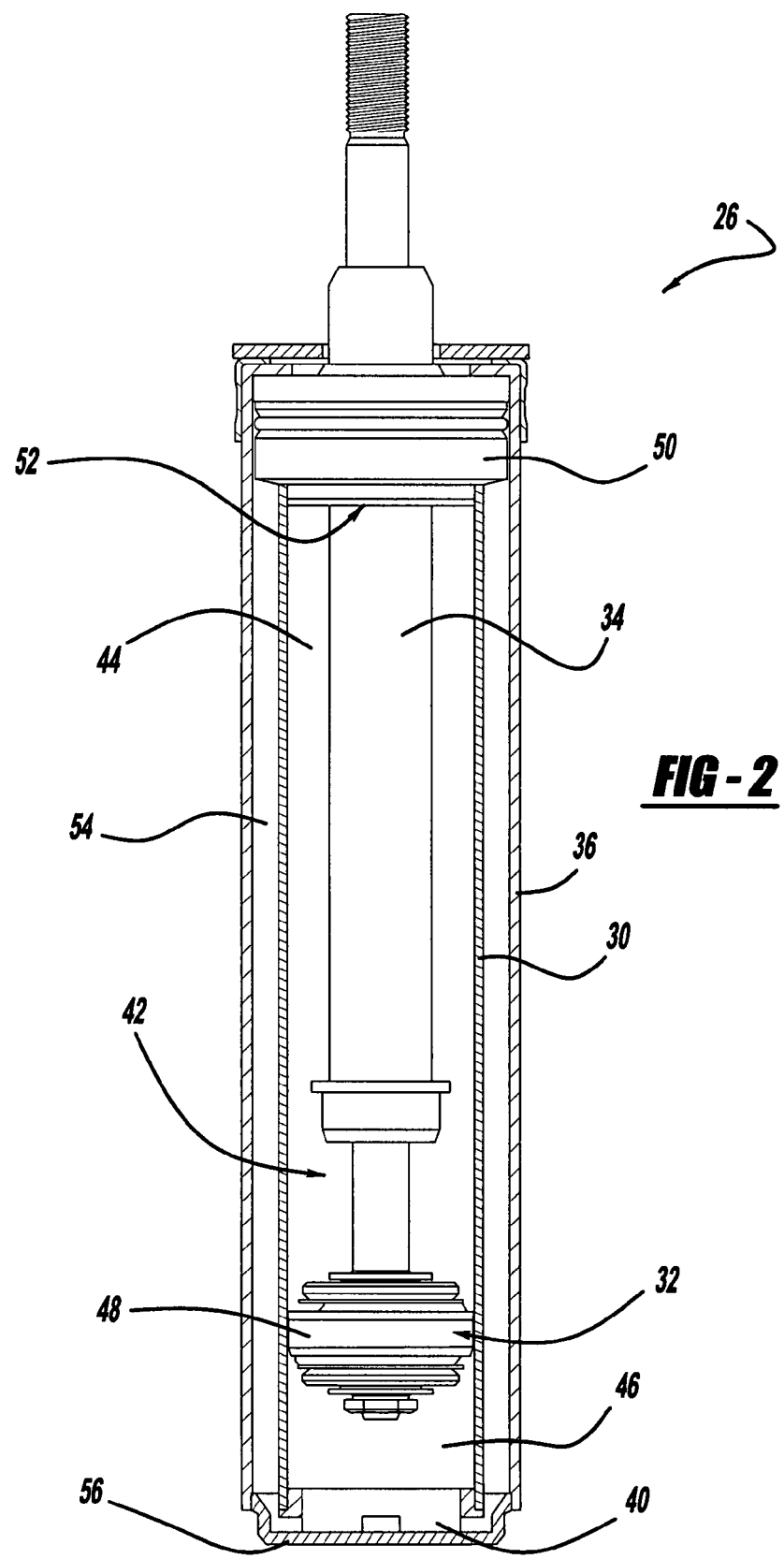
FIG. 2 is a side view, partially in cross-section, of a shock absorber incorporating the valving system in accordance with the present disclosure.
Figure 3:
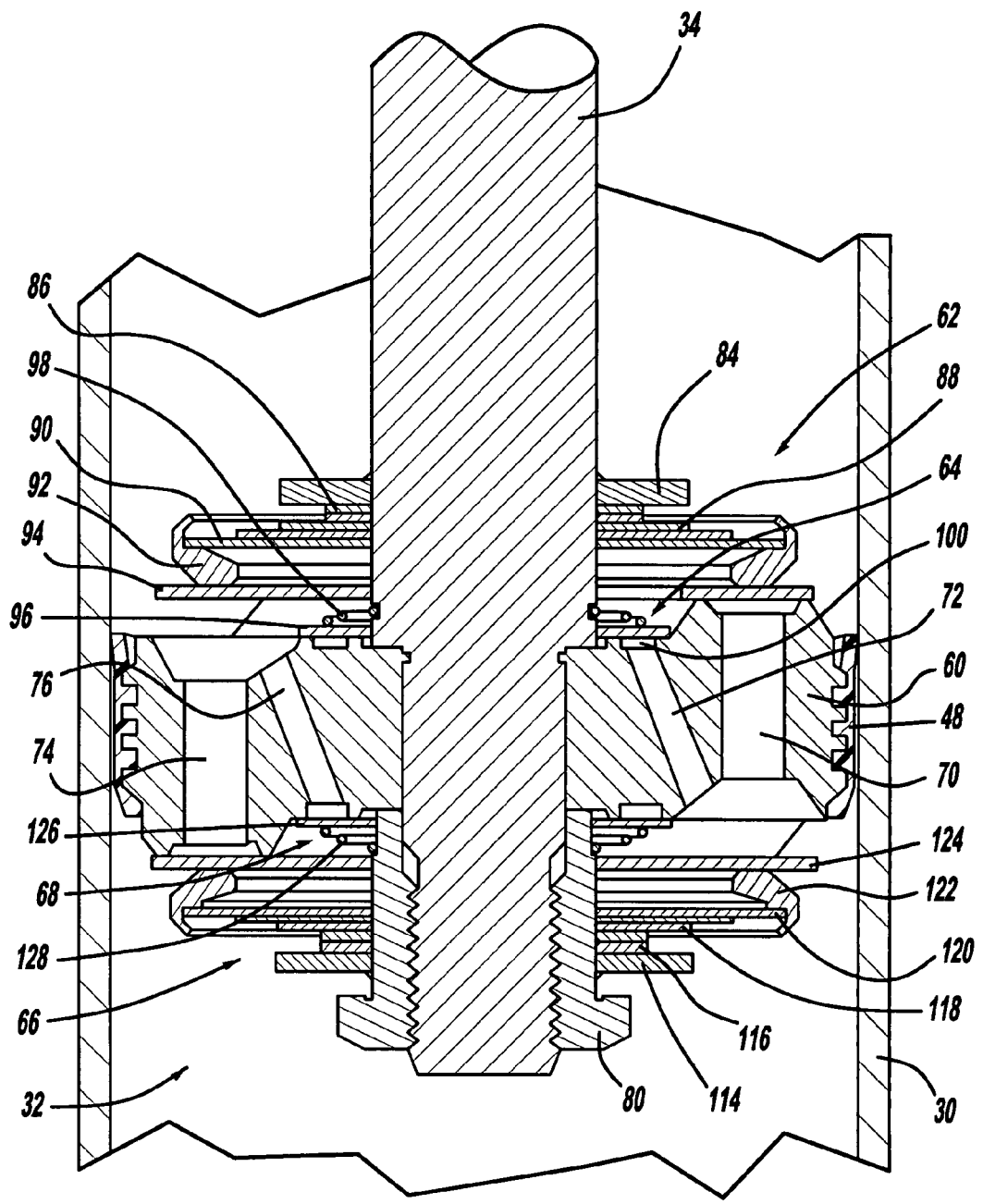
FIG. 3 is an enlarged side view of the piston assembly incorporating the valving system in accordance with the present disclosure.
Figure 4:
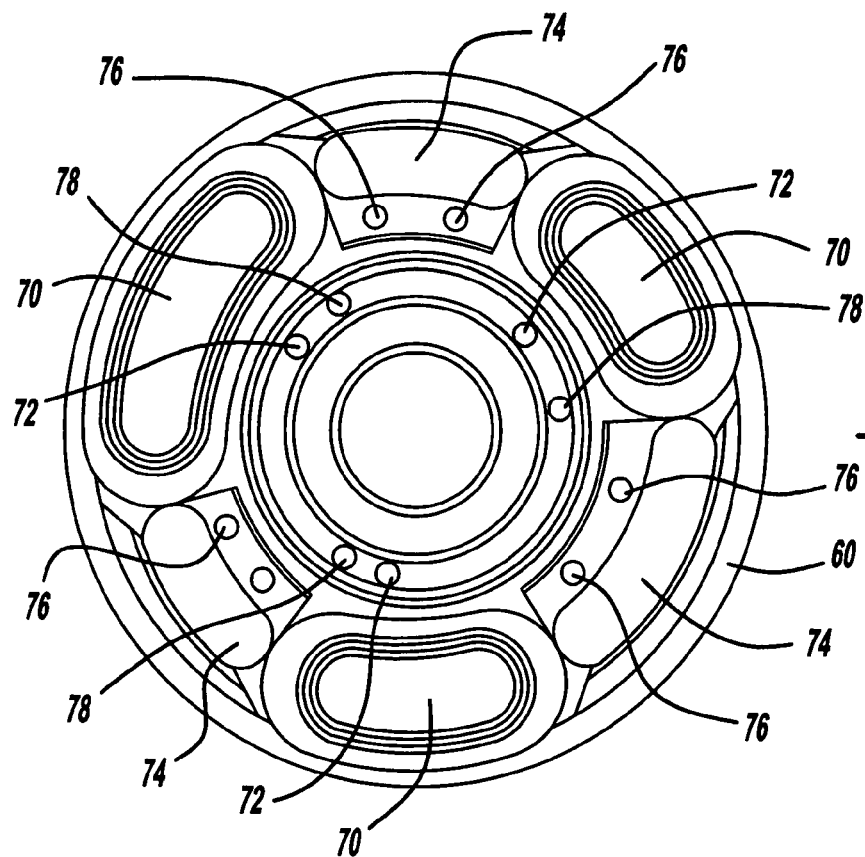
FIG. 4 is a top plan view of the piston illustrated in FIG. 3.
Figure 5A:
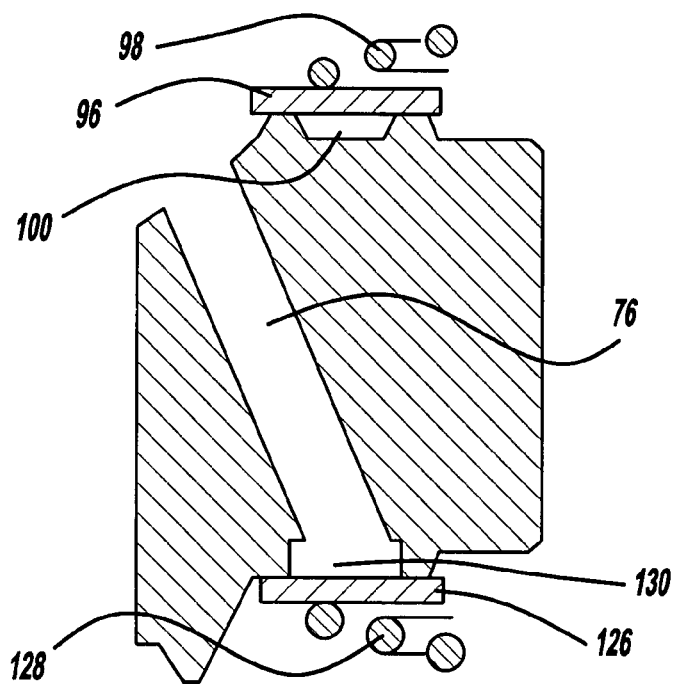
FIGS. 5A-5C are side cross-sectional views showing the various flow passages which define the low speed bleed circuits in accordance with the present disclosure.
Figure 5B:
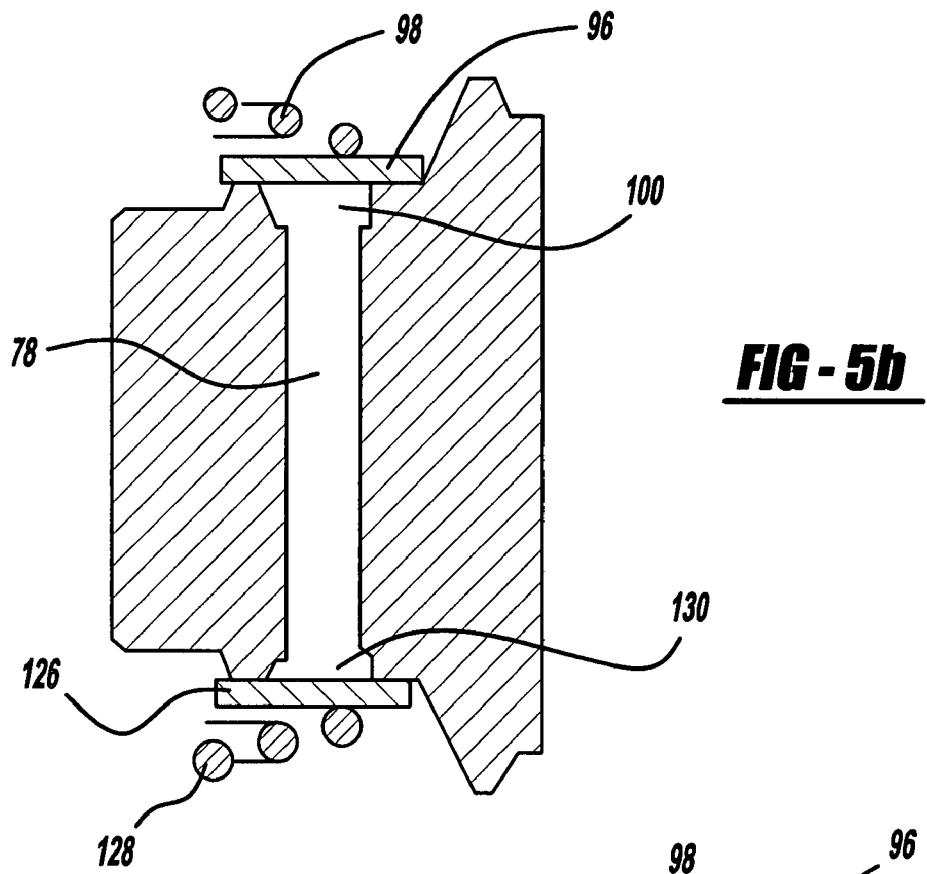
Figure 5C:
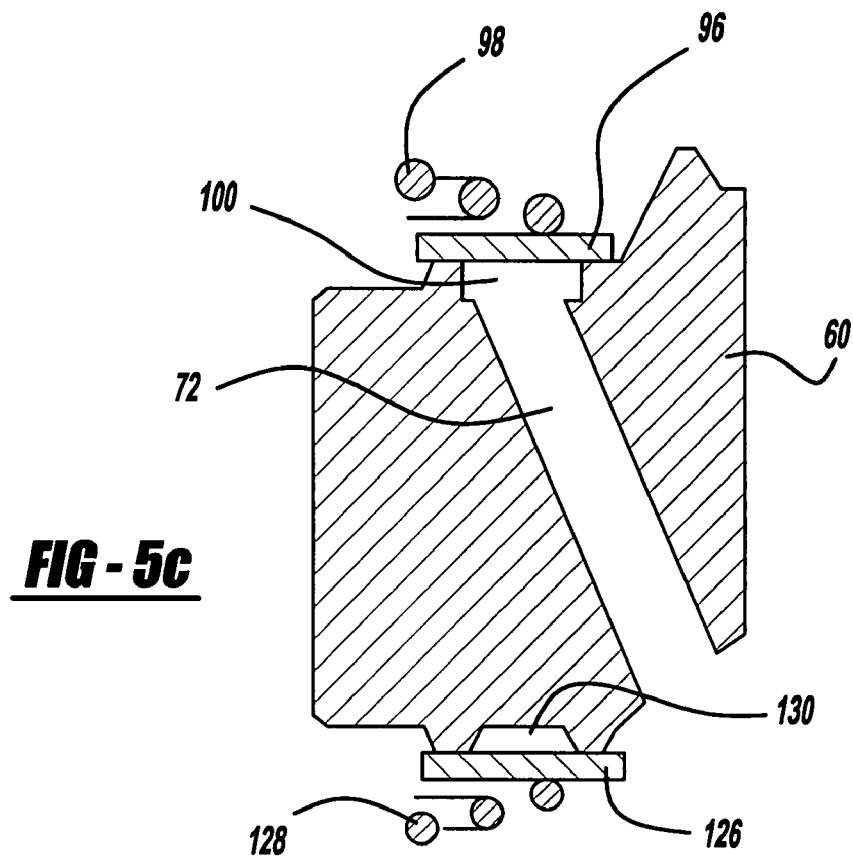

Referring now to FIG. 2, shock absorber 26 is shown in greater detail. While FIG. 2 shows only shock absorber 26, it is to be understood that shock absorber 20 also includes the variable bleed orifice valving in accordance with the present invention which is described below for shock absorber 26. Shock absorber 20 differs from shock absorber 26 in the away in which it is adapted to be connected to the sprung and unsprung portions of vehicle 10. Shock absorber 26 comprises a pressure tube 30, a piston assembly 32, a piston rod 34, a reservoir tube 36 and a base fitting 40.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of both pressure tube 30 and reservoir tube 36. A sealing system 52 seals the interface between upper end cap 50, pressure tube 30, reservoir tube 36 and piston rod 34. The end of piston rod 34 opposite to piston assembly 32 is adapted, in the preferred embodiment, to be secured to the sprung portion of vehicle 10. Valving in piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 than the amount of fluid displaced in lower working chamber 46. This difference in the amount of fluid displaced is known as the "rod volume" and it flows through base fitting 40. While shock absorber 26 is being illustrated as a dual tube shock absorber having base fitting 40, it is within the scope of the present invention to utilize piston assembly 32 in a mono-tube designed shock absorber if desired.

Reservoir tube 36 surrounds pressure tube 30 to define a reserve chamber 54 located between the tubes. The bottom end of reservoir tube 36 is closed by an end cap 56 which is adapted, in the preferred embodiment, to be connected to the unsprung portion of vehicle 10. The upper end of reservoir tube 36 is attached to upper end cap 50. Base fitting 40 is disposed between lower working chamber 46 and reserve chamber 54 to allow the flow of fluid between the two chambers. When shock absorber 26 extends in length (rebound), an additional volume of fluid is needed in lower working chamber 46 due to the "rod volume" concept. Thus, fluid will flow from reserve chamber 54 to lower working chamber 46 through base fitting 40. When shock absorber 26 compresses in length (compression), an excess volume of fluid must be removed from lower working chamber 46 due to the "rod volume" concept. Thus, fluid will flow from lower working chamber 46 to reserve chamber 54 through base fitting 40.

The present disclosure is directed to the full flow piston assembly 32 which includes variable bleed orifice valving for both rebound and compression strokes which is independent of the mid/high speed valving. Piston assembly 32 provides an independent tunable smooth transition between the low speed valving and the mid/high speed valving in both a compression movement and a rebound movement of shock absorber 26. The damping characteristics for both rebound (extension) and compression for shock absorber 26 are determined by piston assembly 32 thus eliminating the need for a base valve assembly.

Referring now to FIGS. 3-5C, piston assembly 32 comprises a piston 60, main compression valve assembly 62, a bleed compression valve assembly 64, a main rebound valve assembly 66 and a bleed rebound valve assembly 68. Piston 60 is secured to piston rod 34 and it defines a plurality of main compression fluid passages 70, a plurality of bleed compression fluid passages 72, a plurality of main rebound fluid passages 74, a plurality of bleed rebound fluid passages 76 and a plurality of interconnecting fluid passages 78. Piston 60 abuts a shoulder formed on piston rod 34 and a retaining nut 80 secures piston 60 to piston rod 34.

Main compression valve assembly 62 comprises a support washer 84, a bending preload disc 86, a plurality of valve discs 88, an interface disc 90, an interface 92 and an intake valve disc 94. Support washer 84 is threadingly or slidingly received on piston rod 34 and is disposed above piston 60. Support washer 84 is positioned on piston rod 34 such that the specified amount of preload is provided by valve discs 88 and interface disc 90 and then it is welded to piston rod 34 or secured to piston rod 34 by other means known in the art. Interface 92 and intake valve disc 94 are free to move axially with respect to piston rod 34 to open and close main compression fluid passages 70 while leaving main rebound fluid passages 74 and bleed rebound fluid passage 76 open. The axial movement of interface 92 and intake valve disc 94 eliminates the need for these components to bend to open main compression fluid passages 70 and thus provide a full displacement valve disc for the assembly.

Bleed compression valve assembly 64 comprises a valve disc 96 and a valve spring 98. Valve disc 96 abuts piston 60 and closes bleed compression fluid passages 72 while leaving main rebound fluid passages 74 and bleed rebound fluid passages 76 open. Valve spring 98 is disposed between valve disc 96 and piston rod 34 to bias valve disc 96 against a pair of lands formed on piston 60 to define an annular fluid chamber 100 which is in communication with bleed compression fluid passages 72. Valve spring 98 is secured to piston rod 34 by being located within a groove formed on piston rod 34 or by other means known in the art.

Main rebound valve assembly 66 comprises a support washer 114, a bending preload disc 116, a plurality of valve discs 118, an interface disc 120, an interface 122 and an intake valve disc 124. Support washer 114 is threadingly or slidingly received on retaining nut 80 and is disposed below piston 60. Support washer 114 is positioned on retaining nut 80 such that the specified amount of preload is provided by valve discs 118 and interface disc 120 and then it is welded to retaining nut 80 or secured to retaining nut 80 by other means known in the art. Interface 122 and intake valve disc 124 are free to move axially with respect to piston rod 34 to open and close main rebound fluid passages 74 while leaving main compression fluid passages 70 and bleed compression fluid passage 72 open. The axial movement of interface 122 and intake valve disc 124 eliminates the need for these components to bend to open main rebound fluid passages 74 and thus provide a full displacement valve disc for the assembly.

Bleed rebound valve assembly 68 comprises a valve disc 126 and a valve spring 128. Valve disc 126 abuts piston 60 and closes bleed rebound fluid passages 76 while leaving main compression fluid passages 70 and bleed compression fluid passages 72 open. Valve spring 128 is disposed between valve disc 126 and retaining nut 80 to bias valve disc 126 against a pair of lands formed on piston 60 to define an annular fluid chamber 130 which is in communication with bleed rebound fluid passages 76. Valve spring 128 is secured to retaining nut 80 by being located within a groove formed on retaining nut 80 or by other means known in the art.

Interconnecting fluid passages 78 extend axially through piston 60 to interconnect fluid chamber 100 with fluid chamber 130 such that fluid chamber 100 is in communication with fluid chamber 130.

During a compression stroke, there are three flows of fluid between lower working chamber 46 and upper working chamber 44. A compression stroke of piston assembly 32 causes the fluid pressure in lower working chamber 46, in the plurality of main compression fluid passages 70 and in the plurality of bleed compression fluid passages 72 to increase. Initially, fluid flows into bleed compression fluid passages 72, into fluid chamber 100, through interconnecting fluid passages 78, into fluid chamber 130, through the plurality of bleed rebound fluid passages 76 and into upper working chamber 44. This is the first flow of fluid and it is through a continuously open fluid flow path which allows fluid flow at zero or near zero velocity of piston assembly 32 during a compression stroke. This makes it possible to eliminate the offset damping force at zero speed.

When the speed of piston assembly 32 increases, fluid pressure within the plurality of bleed compression fluid passages 72 will increase and the fluid pressure force applied to valve disc 96 will overcome the biasing load of valve spring 98 and valve disc 96 will move axially to open the plurality of bleed compression fluid passages 72 to provide the second flow of fluid.

When the speed of piston assembly 32 increases further, fluid pressure within the plurality of main compression fluid passages 70 will increase and the fluid pressure force applied to intake valve disc 94 will overcome the biasing load of valve discs 88 and interface disc 90 and intake valve disc 94 will move axially to open the plurality of main compression fluid passages 70 to provide the third flow of fluid.

During a rebound stroke, there are also three flows of fluid between upper working chamber 44 and lower working chamber 46. A rebound stroke of piston assembly 32 causes the fluid pressure in upper working chamber 44, in the plurality of main rebound fluid passages 74 and in the plurality of bleed rebound fluid passages 76 to increase. Initially, fluid flows into bleed rebound fluid passages 76, into fluid chamber 130, through interconnecting fluid passages 78, into fluid chamber 100, through the plurality of bleed compression fluid passages 72 and into lower working chamber 46. This is the first flow of fluid and it is through a continuously open fluid flow path which allows fluid flow at zero or near zero velocity of piston assembly 32 during a rebound stroke. This makes it possible to eliminate the offset damping force at zero speed.

When the speed of piston assembly 32 increases, fluid pressure within the plurality of bleed rebound fluid passages 76 will increase and the fluid pressure force applied to valve disc 126 will overcome the biasing load of valve spring 128 and valve disc 126 will move axially to open the plurality of bleed rebound fluid passages 76 to provide the second flow of fluid.

When the speed of piston assembly 32 increases further, fluid pressure within the plurality of main rebound fluid passages 74 will increase and the fluid pressure force applied to intake valve disc 124 will overcome the biasing load of valve discs 118 and interface disc 120 and intake valve disc 124 will move axially to open the plurality of main rebound fluid passages 74 to provide the third flow of fluid.

The tuning of the various fluid flows can be controlled by controlling the size and number of passages 70, 72, 74, 76 and 78, the size of chamber 100 and 130, the biasing loads of valve springs 98 and 128, valve discs 88 and 118 and interface discs 90 and 120 as well as other design features for shock absorber 26.

What is claimed is:

1. A shock absorber comprising:
    a pressure tube defining a working chamber;
    a piston disposed within said working chamber, said piston dividing said working chamber into an upper working chamber and a lower working chamber;
    a first compression passage extending through said piston between said upper and said lower working chambers;
    a first compression valve assembly engaging a first pair of annular lands defined by said piston, said first compression valve assembly closing said first compression passage;
    a first rebound passage extending through said piston between said upper and said lower working chambers;
    a first rebound valve assembly engaging a second pair of annular lands defined by said piston, said first rebound valve assembly closing said first rebound passage; and
    an interconnecting passage disposed radially inward from said first compression passage, radially inward from said first rebound passage and extending through said piston, said interconnecting passage defining a continuously open flow path extending from said upper working chamber through said entire first rebound passage through said interconnecting passage, through said entire first compression passage and into said lower working chamber;
    a second compression passage disposed radially outward from said first compression passage and extending through said piston between said upper and said lower working chambers;
    a second compression valve assembly engaging said piston, said compression valve assembly closing said second compression passage;
    a second rebound passage disposed radially outward from said first rebound passage and extending through said piston between said upper and said lower working chambers; and
    a second rebound valve assembly engaging said piston, said second rebound valve assembly closing said second rebound passage.

2. The shock absorber according to claim 1, wherein said first compression valve assembly comprises a first valve disc engaging said piston, a first fluid chamber being formed between said first valve disc and said piston, said interconnecting passage being in communication with said first fluid chamber.

3. The shock absorber according to claim 1, wherein said first rebound valve assembly comprises a first valve disc engaging said piston, a first fluid chamber being formed between said first valve disc and said piston, said interconnecting passage being in communication with said first fluid chamber.

4. The shock absorber according to claim 3, wherein said first compression valve assembly comprises a second valve disc engaging said piston, a second fluid chamber being formed between said second valve disc and said piston, said interconnecting passage being in communication with said second fluid chamber.

5. The shock absorber according to claim 1, further comprising a plurality of first rebound passages extending through said piston between said upper and said lower working chambers, said interconnecting passage being in communication with said plurality of rebound passages.

6. The shock absorber according to claim 1, further comprising a plurality of first compression passages extending through said piston between said upper and said lower working chambers, said interconnecting passage being in communication with said plurality of compression passages.

7. The shock absorber according to claim 6, further comprising a plurality of first rebound passages extending through said piston between said upper and said lower working chambers, said interconnecting passage being in communication with said plurality of rebound passages.

8. The shock absorber according to claim 1, further comprising a plurality of first compression passages and a plurality of second compression passages.

9. The shock absorber according to claim 1, further comprising a plurality of first rebound passages and a plurality of second rebound passages.

10. The shock absorber according to claim 9, further comprising a plurality of first compression passages and a plurality of second compression passages.

11. The shock absorber according to claim 1, wherein said first compression passage, said first rebound passage and said interconnecting passage define a flow path between said upper and said lower working chambers that is always open.

12. The shock absorber according to claim 1, wherein said piston has a first side disposed adjacent said upper working chamber and a second side disposed adjacent said lower working chamber, said continuously open flow path extending from said first side to said second side then from said second side to said first side and then from said first side to said second side.

* * * * *